United States Patent
Cannon

(10) Patent No.: US 8,089,392 B2
(45) Date of Patent: Jan. 3, 2012

(54) RADAR COORDINATE REGISTRATION

(75) Inventor: Paul Stephen Cannon, Malvern (GB)

(73) Assignee: Qinetiq Limited, London (GB)

( * ) Notice: Subject to any disclaimer, the term of this patent is extended or adjusted under 35 U.S.C. 154(b) by 251 days.

(21) Appl. No.: 12/602,852

(22) PCT Filed: May 30, 2008

(86) PCT No.: PCT/GB2008/001839
§ 371 (c)(1),
(2), (4) Date: Dec. 3, 2009

(87) PCT Pub. No.: WO2008/152354
PCT Pub. Date: Dec. 18, 2008

(65) Prior Publication Data
US 2010/0156703 A1    Jun. 24, 2010

(30) Foreign Application Priority Data
Jun. 15, 2007    (GB) .................................. 0711531.4

(51) Int. Cl.
*G01S 13/46* (2006.01)
(52) U.S. Cl. .......... 342/42; 342/125; 342/126; 342/159; 342/162
(58) Field of Classification Search .............. 342/42, 342/59, 89–90, 95–97, 107–108, 125–126, 342/133, 139–140, 146–148, 159–162
See application file for complete search history.

(56) References Cited

U.S. PATENT DOCUMENTS

| | | | | |
|---|---|---|---|---|
| 4,554,546 | A * | 11/1985 | Herbreteau et al. | 342/26 D |
| 5,440,312 | A * | 8/1995 | Anderson | 342/189 |
| 5,469,168 | A * | 11/1995 | Anderson | 342/26 D |
| 5,943,629 | A * | 8/1999 | Ballard et al. | 702/2 |
| 6,232,913 | B1 * | 5/2001 | Lehtinen | 342/137 |
| 6,243,037 | B1 * | 6/2001 | Pulford et al. | 342/95 |
| 7,821,446 | B2 * | 10/2010 | Landreth et al. | 342/132 |
| 2005/0035897 | A1 * | 2/2005 | Perl et al. | 342/29 |
| 2010/0156703 | A1 * | 6/2010 | Cannon | 342/175 |

FOREIGN PATENT DOCUMENTS
AU    18463/92 B    1/1993
(Continued)

OTHER PUBLICATIONS

Anderson, R.; Krolik, J.; , "Multipath track association for over-the-horizon radar using a bootstrapped statistical ionospheric model," Signals, Systems, and Computers, 1999. Conference Record of the Thirty-Third Asilomar Conference on , vol. 1, no., pp. 8-14 vol. 1, 1999.*

(Continued)

*Primary Examiner* — John Sotomayor
(74) *Attorney, Agent, or Firm* — Oliff & Berridge, PLC

(57) ABSTRACT

Integration of ionospheric models in over the horizon radars (OTHR) is achieved with very little or substantially no change to existing coordinate registration systems or software by specifying a virtual transponder at a target location and generating a signal which appears to have emanated from a transponder at that location. A return path to said virtual transponder is ray-traced through the ionospheric model to produce propagation parameters; and an appropriately delayed virtual transponder signal is inserted into the receiver. The result produced at the receiver is used to perform coordinate registration for further received signals.

10 Claims, 1 Drawing Sheet

FOREIGN PATENT DOCUMENTS

Figure 1:
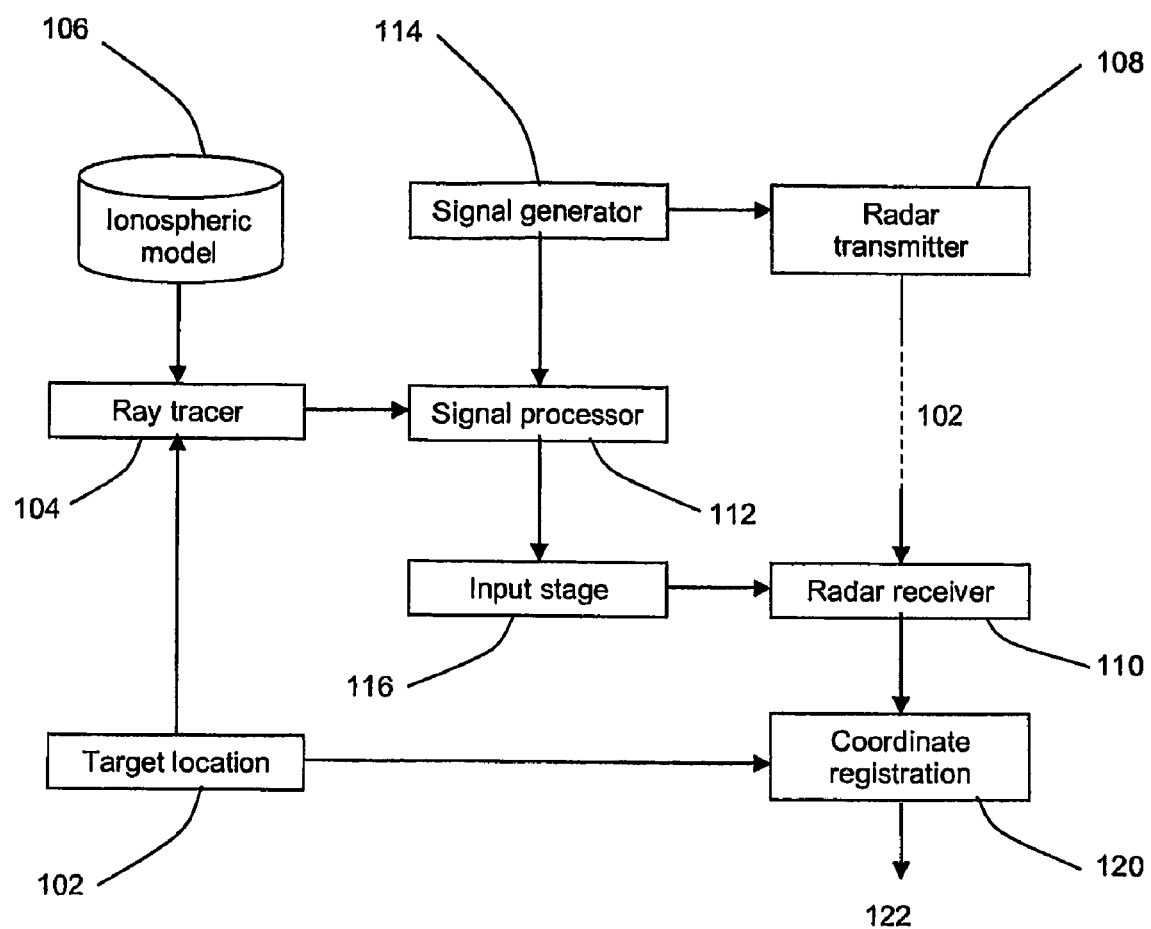

FR 2698448 A1 * 5/1994
WO WO 2008152354 A1 * 12/2008

OTHER PUBLICATIONS

Anderson, R.H.; Krolik, J.L.; , "The performance of maximum likelihood over-the-horizon radar coordinate registration," Acoustics, Speech and Signal Processing, 1998. Proceedings of the 1998 IEEE International Conference on , vol. 4, no., pp. 2481-2484 vol. 4, May 12-15, 1998.*

Krolik, J.L.; Anderson, R.H.; , "Maximum likelihood coordinate registration for over-the-horizon radar," Signal Processing, IEEE Transactions on , vol. 45, No. 4, pp. 945-959, Apr. 1997.*

Nickisch, L.J.; Hausman, M.A.; Fridman, S.; , "Traveling Ionospheric Disturbance Mitigation for OTH Radar," Radar Conference, 2007 IEEE , vol., no., pp. 362-366, Apr. 17-20, 2007.*

Cuccoli, F.; Facheris, L.; Giuli, D.; Sermi, F.; , "Over The Horizon Sky-Wave Radar: Simulation tool for Coordinate Registration method based on Sea-Land transitions identification," Radar Conference, 2009. EuRAD 2009. European , vol., no., pp. 208-211, Sep. 30, 2009-Oct. 2, 2009.*

Target localization and track association for over-the-horizon radar with a statistical ionospheric model Anderson, Richard Hugh. Proquest Dissertations And Theses 1999. Section 0066, Part 0544 118 pages; [Ph.D. dissertation].United States—North Carolina: Duke University; 1999. Publication No. AAT 9942499.*

Dall et al.; "Evaluation of a Model Based Data Fusion Algorithm with Multi-mode OTHR Data;" *IEEE*; 1993; pp. 300-304; vol. 1.

Anderson et al.; "The Performance of Maximum Likelihood Over-the-Horizon Radar Coordinate Registration;" *IEEE*; 1998; pp. 2481-2482; vol. 4.

Anderson et al.; "Multipath Track Association for Over-the Horizon Radar using a Bootstrapped Statistical Ionospheric Model;" *IEEE*; 1999; pp. 8-14.

Krolik et al.; Maximum Likelihood Coordinate Registration for Over-the-Horizon Radar; *IEEE*; 1997; pp. 945-959.

Norman et al.; "A two-dimensional analytic ray tracing technique accommodating horizontal gradients;" *Radio Science*; 1997; pp. 387-396; vol. 32; No. 2.

Angling et al.; "Assimilation of radio occultation measurements into background ionospheric models;" *Radio Science*; 2004; vol. 39.

International Search Report for International Application No. PCT/GB2008/001839, issued Sep. 26, 2008.

Written Opinion of the International Searching Authority for International Application No. PCT/GB2008/001839, issued Sep. 26, 2008.

British Search Report for Application No. 0711531.4, issued Oct. 8, 2007.

* cited by examiner

RADAR COORDINATE REGISTRATION

The present invention relates to radar systems and methods and particularly to over the horizon radar (OTHR).

Conventional radar systems operating at microwave frequencies typically have a range limited by the curvature of the earth, because of the straight line propagation nature of electromagnetic waves. As such, these radar systems have maximum ranges of the order of tens of kilometers. OTHR systems, as the name suggests, allow radar monitoring to be extended beyond the limits imposed by the horizon, and ranges of thousands of kilometers are possible.

The operation of OTHR systems relies on ionospheric reflection of certain radio waves. Transmitted waves can be reflected or backscattered from the ionosphere, and the reflection from the target likewise reflected back to the receiver. Such systems typically operate at wavelengths of 3 MHz to 30 MHz, resulting in antenna arrays up to a kilometer in size.

Return signals from OTHR systems are unsurprisingly weak and contain high levels of noise and clutter. In fact, it is only with the significant increase in signal processing capability over the past 20 years that OTHR has become a truly viable technology. In addition, ionospheric reflection is highly variable, and varies with the time of day amongst other factors. Current systems therefore attempt to adapt to changes in the ionosphere by making measurements of the prevailing ionosphere using the radar itself and/or using a vertical incidence ionosondes located close to the radar and spatially extrapolating this information. The resulting information is used to convert radar-range to ground-range—a process known as co-ordinate registration.

Some OTHR radars also deploy transponders and other instrumentation at known locations—these transponders pick up the transmitted signals and retransmit them to provide reference signals. The effectiveness of the technique is limited by the spatial homogeneity of the ionosphere which requires that they be located relatively close to the radar target. This necessitates access to areas which may not be available. The reliance on transponders corrections also places a strain on radar resources when a radar beam cannot simultaneously illuminate both the area of interest and the transponder.

Another approach to improve accuracy involves the use of vertical sounders at the mid-point, however this requires access to a landmass at the mid-point which may not be available.

Most recently, it has been suggested that assimilative ionospheric models of the ionosphere could provide the necessary specification of the ionosphere to provide improved performance in OTHR systems. Assimilative models combine a variety of data sources and ingest the data into a background model in a structured mathematical way to derive a best estimate specification of the ionosphere. The range of data inputs is wide and could include ground base measurements of the ionosphere by the radar (e.g. backscatter, vertical and oblique ionograms and transponder signals). However, the data could also include other space-based and ground based data streams such as those from total electron content (TEC) receivers. For an example of ionospheric assimilative modelling, see M. J. Angling and P. S. Cannon, "Assimilation of radio occultation measurements into background ionospheric models" Radio Science, Vol. 39, RS1S08, doi:10.1029/2002RS002819, 2004.

However, integration and implementation of such assimilative models in existing and even planned radar systems is expensive and can demand significant changes in radar frequency management and coordinate registration architecture.

It is an object of the present invention to provide an improved radar system.

According to a first aspect of the invention there is provided a method of radar coordinate registration, the method comprising specifying a virtual transponder at a target location, providing an ionospheric model, and ray tracing through said model from the radar transmitter to said virtual transponder and back to a receiver to produce propagation parameters, delaying a virtual transponder signal according to said propagation parameters, and inserting said delayed signal into said receiver, and using said received virtual transponder signal to perform coordinate registration for further received signals.

By generating a signal which appears to have emanated from a transponder at a known location, a solution is provided to the use of assimilative and other ionospheric specification models in OTHR radars with very little or substantially no change to existing coordinate registration systems or software. The virtual transponder signals are then processed by the radar system in the same way as signals from a real transponder, to aid coordinate registration.

In one embodiment, the ionospheric model is produced by ionospheric assimilative modelling, as explained above.

Ray tracing may be performed by any known method, such as numerical techniques using Haselgrove's equations, however these are typically computationally expensive, and therefore not well suited for real time use. Embodiments of the invention therefore advantageously use analytic ray tracing which uses explicit equations to define the ionosphere and to determine ray parameters. Although less accurate, such techniques are less computationally expensive and therefore less time consuming, and more suited to real time application. A particularly suitable analytic technique is a segmented analytic technique, in which the ground range of a ray path is divided into multiple segments, and analytic ray equations are applied independently to advance a ray through each segment. This ray tracing technique is described in detail for example in R. J. Norman and P. S. Cannon, "A two-dimensional ray tracing technique accommodating horizontal gradients", Radio Science, Vol. 32, No. 2, Pages 387-396, March-April 1997.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying FIG. 1, which illustrates schematically an OTHR system according to an aspect of the present invention.

A target location is determined at 102, and input to a ray tracer 104. The target may be selected at or close to a specific geographical location to be monitored, or alternatively multiple targets forming an array pattern may be generated for wide area coverage. The ray tracer is also provided with an ionospheric model 106 including an electron density map, and ray traces a path from the transmitter to the target location and back to the receiver 110, appropriate to signals from a real transponder at that target location. From this computation, the ray tracer determines the group delay associated with the ray path through the ionosphere at a particular time for the selected target location.

A signal processor 112 receives a signal from generator 114, which in this example also provides the input to radar transmitter 108 (which may be embodied in the same physical antenna or antenna array as receiver 110), but may be a separate dedicated virtual transponder generator. Based on the group delay provided from the ray tracer, the processor 112 applies the appropriate delay and attenuation to multiple copies of the signal from generator 114, corresponding to modelled multipath propagation.

The delayed and attenuated signals are passed to an input stage 116, which inserts the signals into the radar receiver, via the antenna feed or the beam former for example. The radar receiver also receives backscatter from transmitted radar signals in the conventional fashion, as illustrated by dashed arrow 118.

The output from the radar receiver is input to a coordinate registration stage 120, which may operate substantially identically to that of a conventional prior art OTHR system. Based on the known location of the virtual transponder from 102, the signal from input stage 116 assists registration to ground range of signals reflected from real target objects to provide a radar output 122.

The process can then be repeated for multiple target locations.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of radar coordinate registration, the method comprising:
    specifying a virtual transponder at a target location;
    providing an ionospheric model, and ray tracing through said model from the transmitter to said virtual transponder and back to a receiver to produce propagation parameters;
    delaying a virtual transponder signal according to said propagation parameters, and inserting said delayed signal into said receiver; and
    using said received virtual transponder signal to perform coordinate registration for further received signals.

2. A method according to claim 1, wherein said ionospheric model is produced by ionospheric assimilative modelling.

3. A method according to claim 1, wherein said ray tracing is performed by analytic ray tracing.

4. A method according to claim 3, wherein said ray tracing is performed by segmented analytic ray tracing.

5. A method according to claim 1, wherein said virtual transponder signal is the transmitted radar signal.

6. A method according to claim 1, wherein said propagation parameters are group delays.

7. A method according to claim 1, wherein said delayed virtual transponder signal is attenuated before insertion into the receiver.

8. A method according to claim 1, wherein said delayed virtual transponder signal is inserted into an antenna feed of the receiver.

9. A method according to claim 1, wherein said delayed virtual transponder signal is inserted into a beam former of the receiver.

10. An over the horizon radar system comprising:
    a receiver;
    a signal generator for generating a virtual transponder signal;
    an ionospheric model of the prevailing ionosphere;
    a ray tracing processor for ray tracing through said model from a transmitter to a target location and back to said receiver, and determining propagation parameters;
    a signal processor for delaying and attenuating said virtual transponder signal according to said propagation parameters, and inputting said delayed and attenuated signal into said receiver; and
    a processor for performing coordinate registration for further received signals based on the received virtual transponder signal.

* * * * *